United States Patent [19]
Butler et al.

[11] Patent Number: 6,084,507
[45] Date of Patent: Jul. 4, 2000

[54] TRUCK TURNING SAFETY GATE

[76] Inventors: Isaac Butler; James O. Butler, both of 1043 Oberlin Ave., Lorain, Ohio 44052

[21] Appl. No.: 09/201,400

[22] Filed: Nov. 30, 1998

[51] Int. Cl.[7] ........................................ B60Q 1/00
[52] U.S. Cl. ................................ 340/437; 340/475
[58] Field of Search .......................... 340/475, 468, 340/470, 471, 472, 463, 464, 465, 437

[56] References Cited

U.S. PATENT DOCUMENTS

| | | | |
|---|---|---|---|
| 1,257,661 | 2/1918 | Wittig | 340/475 |
| 1,284,134 | 11/1918 | Ogden | 340/464 |
| 1,311,408 | 7/1919 | Lombardo | 340/468 |
| 1,935,838 | 11/1933 | Efstathiou | 340/463 |
| 2,503,974 | 4/1950 | Sparaco | 340/472 |
| 3,439,326 | 4/1969 | Boudin | 340/472 |

*Primary Examiner*—Jeffery A. Hofsass
*Assistant Examiner*—Daniel Previl

[57] ABSTRACT

A truck turning safety gate for controlling vehicle traffic adjacent to a turning truck. The inventive device includes a pair of actuators securable to a rear of a truck. A pair of signal arms extend from the actuators and are normally oriented in a vertical position. A control panel is positioned in electrical communication with the actuators for permitting manual control of the signal arms, whereby one of the signal arms can be lowered to prevent traffic from approaching along a side of the truck to enable the truck to make a wide turn.

15 Claims, 3 Drawing Sheets

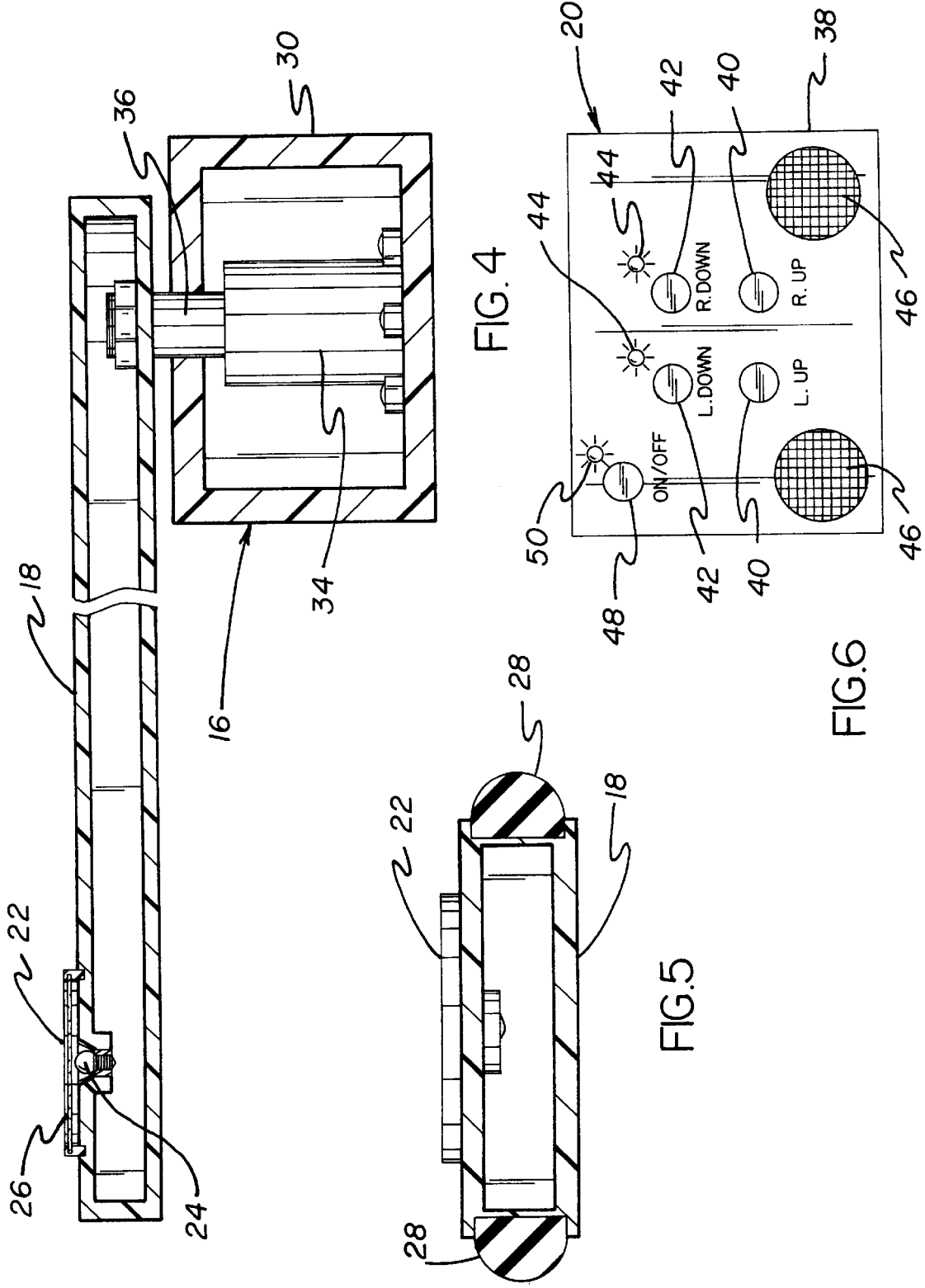

TRUCK TURNING SAFETY GATE

BACKGROUND OF THE INVENTION

1. Field of the Invention

The present invention relates to vehicle control barriers and more particularly pertains to a truck turning safety gate for controlling vehicle traffic adjacent to a turning truck.

2. Description of the Prior Art

The use of vehicle control barriers is known in the prior art. More specifically, vehicle control barriers heretofore devised and utilized are known to consist basically of familiar, expected and obvious structural configurations, notwithstanding the myriad of designs encompassed by the crowded prior art which have been developed for the fulfillment of countless objectives and requirements.

Known prior art vehicle control barriers include U.S. Pat. No. 3,686,794; U.S. Pat. No. 4,681,479; U.S. Pat. No. 5,136,810; U.S. Pat. No. 5,009,542; and U.S. Pat. No. 4,434,578.

While these devices fulfill their respective, particular objectives and requirements, the aforementioned patents do not disclose a truck turning safety gate for controlling vehicle traffic adjacent to a turning truck which includes a pair of actuators securable to a rear of a truck, a pair of signal arms extending from the actuators and normally oriented in a vertical position, and a control panel positioned in electrical communication with the actuators for permitting manual control of the signal arms, whereby one of the signal arms can be lowered to prevent traffic from approaching along a side of the truck to enable the truck to make a wide turn.

In these respects, the truck turning safety gate according to the present invention substantially departs from the conventional concepts and designs of the prior art, and in so doing provides an apparatus primarily developed for the purpose of controlling vehicle traffic adjacent to a turning truck.

SUMMARY OF THE INVENTION

In view of the foregoing disadvantages inherent in the known types of vehicle control barriers now present in the prior art, the present invention provides a new truck turning safety gate construction wherein the same can be utilized for controlling vehicle traffic adjacent to a turning truck. As such, the general purpose of the present invention, which will be described subsequently in greater detail, is to provide a new truck turning safety gate apparatus and method which has many of the advantages of the vehicle control barriers mentioned heretofore and many novel features that result in a truck turning safety gate which is not anticipated, rendered obvious, suggested, or even implied by any of the prior art vehicle control barriers, either alone or in any combination thereof.

To attain this, the present invention generally comprises a truck turning safety gate for controlling vehicle traffic adjacent to a turning truck. The inventive device includes a pair of actuators securable to a rear of a truck. A pair of signal arms extend from the actuators and are normally oriented in a vertical position. A control panel is positioned in electrical communication with the actuators for permitting manual control of the signal arms, whereby one of the signal arms can be lowered to prevent traffic from approaching along a side of the truck to enable the truck to make a wide turn.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application; which is measured by the claims, nor is it intended to be limiting as to the scope of the invention in any way.

It is therefore an object of the present invention to provide a new truck turning safety gate apparatus and method which has many of the advantages of the vehicle control barriers mentioned heretofore and many novel features that result in a truck turning safety gate which is not anticipated, rendered obvious, suggested, or even implied by any of the prior art vehicle control barriers, either alone or in any combination thereof.

It is another object of the present invention to provide a new truck turning safety gate which may be easily and efficiently manufactured and marketed.

It is a further object of the present invention to provide a new truck turning safety gate which is of a durable and reliable construction.

An even further object of the present invention is to provide a new truck turning safety gate which is susceptible of a low cost of manufacture with regard to both materials and labor, and which accordingly is then susceptible of low prices of sale to the consuming public, thereby making such truck turning safety gates economically available to the buying public.

Still yet another object of the present invention is to provide a new truck turning safety gate which provides in the apparatuses and methods of the prior art some of the advantages thereof, while simultaneously overcoming some of the disadvantages normally associated therewith.

Still another object of the present invention is to provide a new truck turning safety gate for controlling vehicle traffic adjacent to a turning truck.

Yet another object of the present invention is to provide a new truck turning safety gate which includes a pair of actuators securable to a rear of a truck, a pair of signal arms extending from the actuators and normally oriented in a vertical position, and a control panel positioned in electrical communication with the actuators for permitting manual control of the signal arms, whereby one of the signal arms can be lowered to prevent traffic from approaching along a side of the truck to enable the truck to make a wide turn.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a cross sectional view taken along line 4—4 of FIG. 2.

FIG. 5 is a cross sectional view taken along line 5—5 of FIG. 2.

FIG. 6 is an elevational view of a control panel of the invention.

Similar reference characters refer to similar parts throughout the several views of the drawings.

DESCRIPTION OF THE PREFERRED EMBODIMENT

Figure 1:
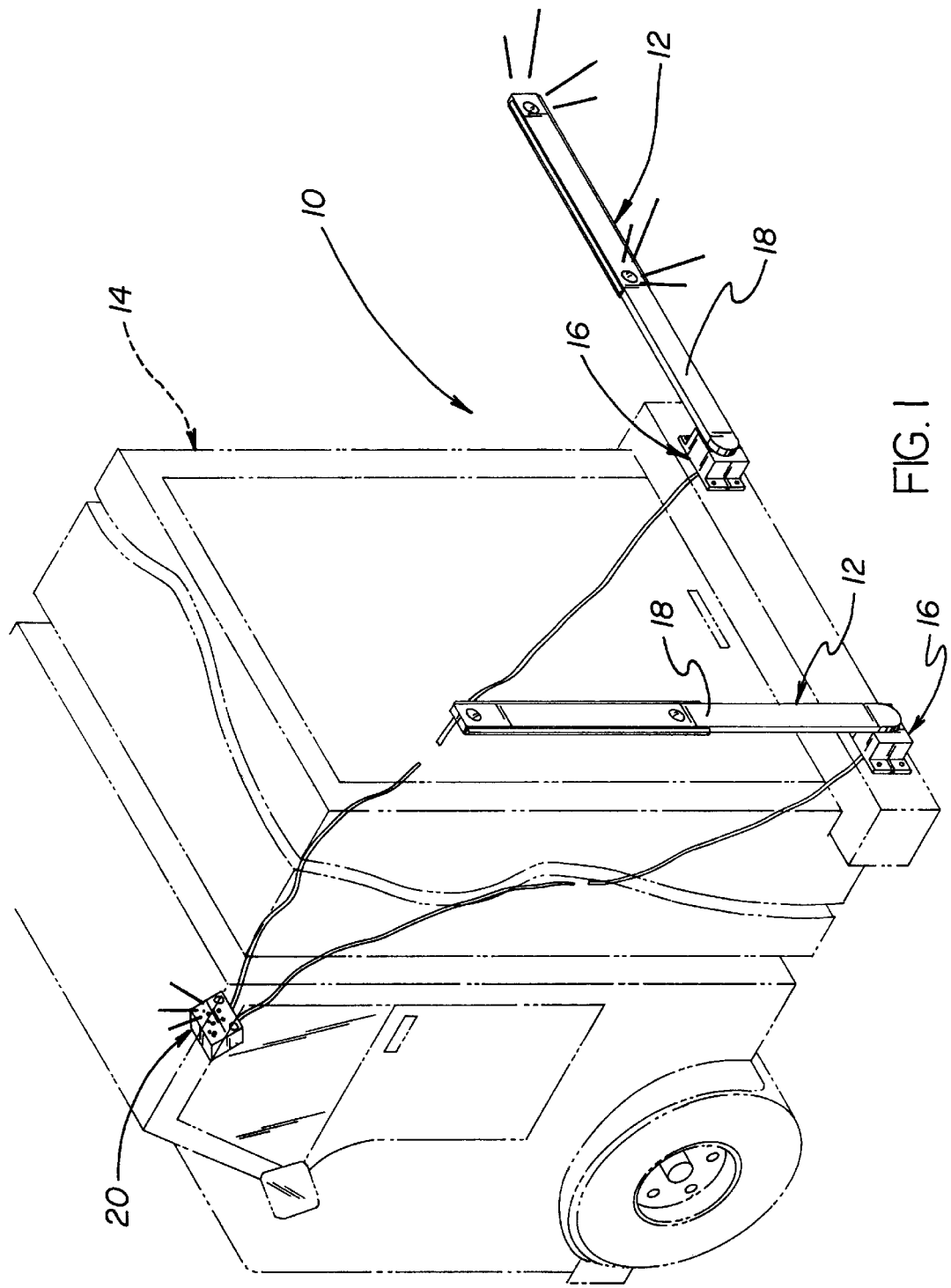
FIG. 1 is a perspective illustration of the preferred embodiment of the truck turning safety gate constructed in accordance with the principles of the present invention.

With reference now to the drawings, and in particular to FIGS. 1–6 thereof, a new truck turning safety gate embodying the principles and concepts of the present invention and generally designated by the reference numeral 10 will be described.

More specifically, it will be noted that the truck turning safety gate 10 comprises left and right signal assemblies 12 which can be secured to the rear of a semi-tractor trailer truck 14 or other vehicle substantially as shown in FIG. 1 of the drawings. Each of the signal assemblies 12 includes an actuator 16 mountable to the truck 14 and a signal arm 18 which can be positioned in either a vertical orientation as shown for the left signal assembly or in a horizontal orientation as shown for the right signal assembly. A control panel means 20 can be mounted within a passenger compartment of the truck 14 and positioned in electrical communication with a power source of the truck. The control panel means 20 is positioned in electrical communication with the actuators of the left and right signal assemblies and can be manually operated to effect energization of either or both of the actuators 16 as desired. By this structure, the control panel 20 can be operated so as to cause at least one of the signal arms 18 to be lowered into a horizontal orientation such that the signal arm projects beyond a side of the truck 14 to preclude traffic from flowing alongside the truck such that the truck can make a wide turn.

Turning now to FIGS. 2 through 5 wherein the present invention 10 is illustrated in detail, it can be shown that the signal arm assemblies 12 of the truck turning safety gate 10 each further comprise one or more signal lights 22 mounted to the signal arm 18 and positioned in electrical communication with the control panel means 20. The signal lights 22 can be energized prior to operation of the actuators 16 to warn surrounding drivers of the intent to lower the signal arm.

As shown in FIG. 4, the signal lights 22 may each comprise a light bulb 24 positioned in electrical communication with the control panel means 20 by unillustrated wires running therebetween. A translucent lens 26, preferably of a suitable warning color, extends over the light bulb 24 to cause the light radiated from the light bulb to be of the color of the lens. The lens 26 is preferably red to warn drivers behind the truck 14 of the subsequent lowering of the arm 18. The arm 18 further includes one or more bumper pads 28 adhesively or otherwise secured thereto and extending therealong which preclude damage to a vehicle should the arm 18 be lowered onto such vehicle. Further, the actuator 16 can be equipped with suitable and conventionally known impact sensors which detect contact between the arm 18 and a surrounding object to cause the arm to be raised therefrom.

Figures 2, 3:
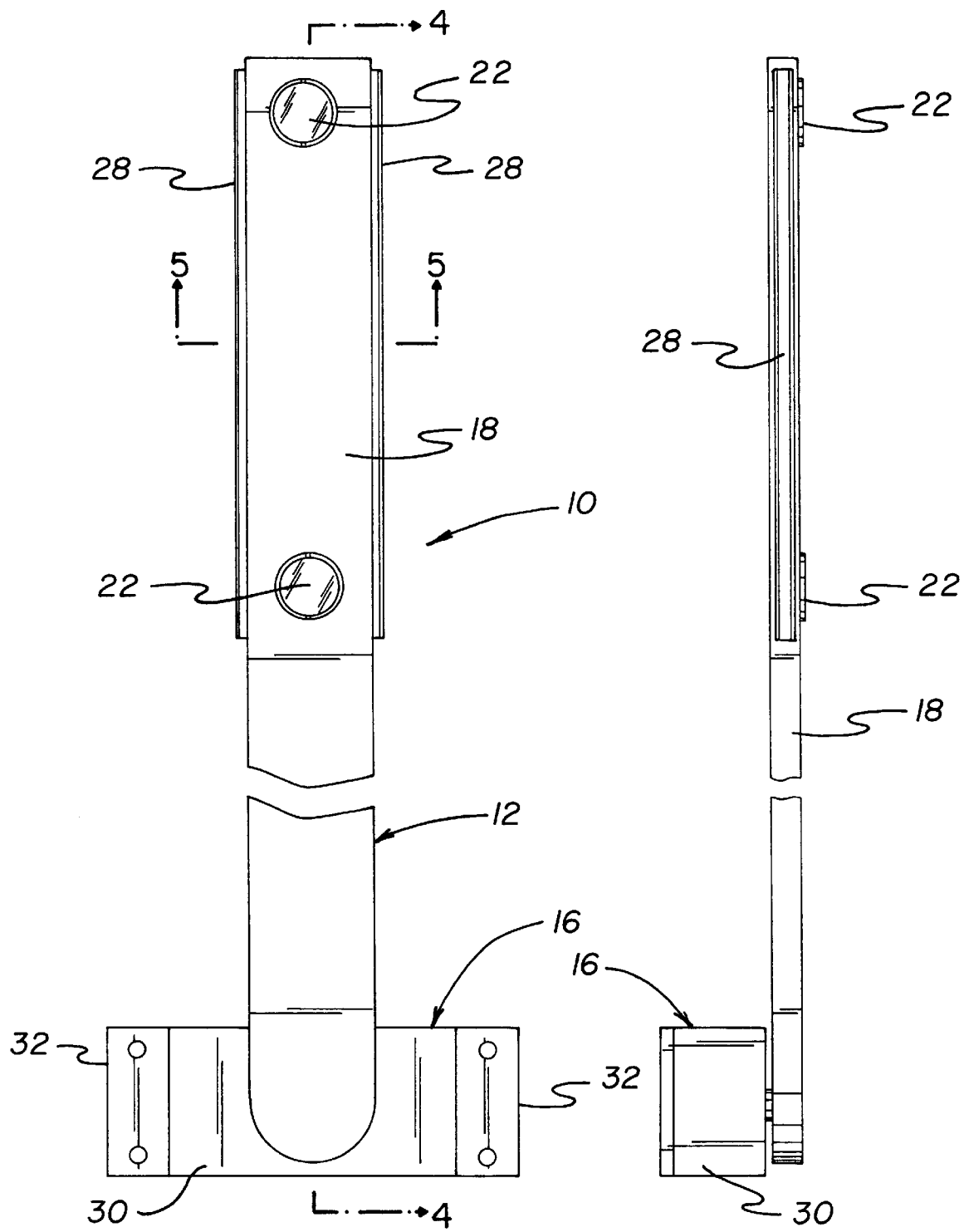
FIG. 2 is an elevational view of the present invention.
FIG. 3 is a side elevational view of the invention.

As shown in FIGS. 2 through 4, the actuator 16 of each of the signal assemblies 12 comprises an actuator housing 30 capable of being mounted to the rear of the truck 14. To this end and as shown in FIG. 2, the actuator housing 30 can include one or more mounting flanges 32 projecting therefrom and having suitable mounting holes directed therethrough which permit for fasteners to be directed through the mounting flanges and into the truck 14 to permit retro-fitting of the device 10 to existing truck or trailer structures. An actuator motor 34, which may be a DC motor, is mounted within the actuator housing 30 and includes a shaft 36 projecting exteriorly of the actuator housing. The arm 18 is mounted to the shaft 36 so as to rotate therewith. The actuator motor 34 is configured to rotate the shaft 36 and the arm 18 attached thereto through a ninety degree arc from a vertical position to a horizontal position and back again during operation of the invention 10. If desired or needed, the actuator 16 can incorporate suitable mechanical limiting mechanisms exterior of the actuator motor 34, but within the actuator housing 30 which limit movement of the arm 18 between the vertical and horizontal positions. By this structure, energization of the actuator motor 34 in a first mode such as by running current in a first direction therethrough will cause the arm 18 to be rotated from the vertical position into the horizontal position. Subsequent energization of the actuator motor 34 in a second mode such as by running current in a second opposite direction therethrough will cause the arm 18 to be rotated from the horizontal position into the vertical position.

As shown in FIG. 6, the control panel means 20 includes a control panel housing 38 which can be mounted within a passenger compartment of the truck 14. A pair of independently operable lowering buttons 40 are mounted to a face of the control panel housing 38 and wired to the actuators 16 so as to be electrically interposeable between a power supply of the truck 14 and the actuators 16 to cause operation of the actuator motors 34 in a first direction. Similarly, a pair of independently operable raising buttons 42 are mounted to the face of the control panel housing 38 and wired to the actuators 16 so as to be electrically interposeable between a power supply of the truck 14 and the actuators 16 to cause operation of the actuator motors 34 in a second direction.

Visual indicators 44 in the form of lights can be mounted to the control panel housing 38 and configured to flash or otherwise indicate a position of either one of the arms 18 to a driver of the truck 14. Moreover, separate audible signal indicators 46 in the form of beepers of noise makers can be mounted to the control panel housing 38 to provide for an audible indication of the status of the arms 18. A master power switch 48 and a visual power indicator 50 are mounted to the control panel housing 38 to permit for selective energization of the device 10 and to indicate the same.

The components 40–50 of the control panel means 20 are electrically interconnected in a known manner and can be electrically coupled to a power source of the truck 14 such as the battery thereof so as to cause energization of the actuator motors 34 in the desired polarization to either raise or lower the arms 18 as described above. If desired, the lowering and raising buttons 40 and 42 could be electrically interconnected with the conventionally known and preexisting turn signal indicators of the truck 14. However, it is preferable that the present invention 10 be operable separately and independently of the existing turn signal system of the truck 14.

Modifications of the present invention 10 include utilizing an unillustrated wind pressure reinforcing rods which reinforce the arms 18 to preclude wind induced bending or breaking thereof. Further, the arms 18 can be configured to extend through telescopic or folding arrangements to provide for increased operational length or decreased storage length thereof. The lights 22 are preferably actuated well in advance, approximately several seconds, of the actuator motor 34 to suitably warn adjacent drivers of the lowering of the arms or arms 18. The visual indicators 44 and audible indicators 46 will operate to alert the driver of the truck 14 to the lowered status of the one or both of the arms 18. The raising buttons 42 can then be manually operated, or alternatively interconnected with the existing turn signal system of the truck 14 so as to be automatically operated, to cause the arms 18 to raise after a turn of the truck 14.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A truck turning safety gate comprising:
   a signal assembly securable to a rear of a vehicle, the signal assembly including an actuator mountable to the vehicle and a signal arm which can be positioned in and moved between a vertical orientation and a horizontal orientation, the signal arm being of an extended length whereby, when in a horizontal orientation, it projects beyond a side of a truck to which it is mounted to preclude traffic from flowing alongside the truck such that the truck can make a wide turn; and
   a control panel means positioned in electrical communication with the actuator of the signal assembly and positionable in electrical communication with a power source of the vehicle for effecting energization of the actuator.

2. The truck turning safety gate of claim 1, wherein the signal arm assembly includes at least one signal light mounted to the signal arm and positioned in electrical communication with the control panel means.

3. The truck turning safety gate of claim 2, wherein the signal light comprises a light bulb mounted to the signal arm and positioned in electrical communication with the control panel means; and a colored translucent lens extending over the light bulb to cause the light radiated from the light bulb to be of the color of the lens.

4. The truck turning safety gate of claim 3, wherein the arm further includes at least one bumper pad secured thereto and extending therealong.

5. The truck turning safety gate of claim 4, wherein the actuator comprises an actuator housing mountable to the rear of the vehicle; and an actuator motor mounted within the actuator housing and including a shaft projecting exteriorly of the actuator housing, with the arm being mounted to the shaft so as to rotate therewith, wherein the actuator motor is configured so as to only rotate the shaft and the arm attached thereto through a ninety degree arc from a vertical position to a horizontal position.

6. The truck turning safety gate of claim 5, wherein the control panel means includes a control panel housing which can be mounted within a passenger compartment of the vehicle; a lowering button mounted to a face of the control panel housing and positioned in electrical communication with the actuator motor to cause operation of the actuator motor in a first direction; and a raising button mounted to the face of the control panel housing and positioned in electrical communication with the actuator motor to cause operation of the actuator motor in a second direction.

7. The truck turning safety gate of claim 6, wherein the control panel means further comprises a visual indicator and an audible indicator mounted to the control panel housing for indicating a position of the arm to a driver of the vehicle.

8. A truck turning safety gate comprising:
   a vehicle;
   a left signal assembly secured to a left rear portion of the vehicle, the left signal assembly including a left actuator mounted to the left rear of the vehicle and a left signal arm which can be positioned in and moved between a vertical orientation and a horizontal orientation;
   a right signal assembly secured to a right rear portion of the vehicle, the right signal assembly including a right actuator mounted to the right rear of the vehicle and a right signal arm which can be positioned in and moved between a vertical orientation and a horizontal orientation, the signal arm being of an extended length whereby, when in a horizontal orientation, it projects beyond a side of a truck to which it is mounted to preclude traffic from flowing alongside the truck such that the truck can make a wide turn; and
   a control panel means positioned in electrical communication with the actuators of the left and right signal assemblies and positioned in electrical communication with a power source of the vehicle for effecting selective energization of the actuators.

9. The truck turning safety gate of claim 8, wherein the signal arm assemblies each includes at least one signal light mounted to the signal arm and positioned in electrical communication with the control panel means.

10. The truck turning safety gate of claim 9, wherein each of the signal lights comprises a light bulb mounted to the signal arm and positioned in electrical communication with the control panel means; and a colored translucent lens extending over the light bulb to cause the light radiated from the light bulb to be of the color of the lens.

11. The truck turning safety gate of claim 10, wherein each of the arms further include at least one bumper pad secured thereto and extending therealong.

12. The truck turning safety gate of claim 11, wherein the actuators each comprise an actuator housing mountable to the rear of the vehicle; and an actuator motor mounted within the actuator housing and including a shaft projecting exteriorly of the actuator housing, with the respective arm being mounted to the shaft so as to rotate therewith, wherein the actuator motors are each configured so as to only rotate the shaft and the arm attached thereto through a ninety degree arc from a vertical position to a horizontal position.

13. The truck turning safety gate of claim 12, wherein the control panel means includes a control panel housing mounted within a passenger compartment of the vehicle; a pair of independently operable lowering buttons each mounted to a face of the control panel housing and positioned in electrical communication with an individual one of the actuator motors so as to cause operation of the respective actuator motor in a first direction; and a pair of independently operable raising buttons mounted to the face of the control panel housing and positioned in electrical communication with an individual one of the actuator motors so as to cause operation of the respective actuator motor in a second direction.

14. The truck turning safety gate of claim 13, wherein the control panel means further comprises a pair of visual indicators mounted to the control panel housing and each positioned in electrical communication with an individual one of the actuator motors for indicating a position of the respective signal arm to a driver of the vehicle.

15. The truck turning safety gate of claim 14, wherein the control panel means further comprises a pair of audible indicators mounted to the control panel housing and each positioned in electrical communication with an individual one of the actuator motors for indicating a position of the respective signal arm to a driver of the vehicle.

\* \* \* \* \*